United States Patent
Wang et al.

(10) Patent No.: US 8,265,821 B2
(45) Date of Patent: Sep. 11, 2012

(54) METHOD FOR DETERMINING A VOLTAGE LEVEL ACROSS AN ELECTRIC CIRCUIT OF A POWERTRAIN

(75) Inventors: Wei D. Wang, Troy, MI (US); William R. Cawthorne, Milford, MI (US); Aniket Kothari, Southfield, MI (US); Nicholas Kokotovich, Troy, MI (US); Wei Ren, Rochester, MI (US); Bo Zhang, Wixom, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 836 days.

(21) Appl. No.: 12/253,214

(22) Filed: Oct. 16, 2008

(65) Prior Publication Data

US 2009/0108673 A1 Apr. 30, 2009

Related U.S. Application Data

(60) Provisional application No. 60/982,457, filed on Oct. 25, 2007.

(51) Int. Cl.
*B60R 16/033* (2006.01)
*G01R 19/10* (2006.01)
*G01R 31/40* (2006.01)
*G01R 31/36* (2006.01)
*H02J 7/14* (2006.01)
*B60W 10/04* (2006.01)
*B60W 10/26* (2006.01)
*G01R 19/165* (2006.01)

(52) U.S. Cl. . 701/33.7; 701/34.4; 320/162; 340/636.15; 340/636.2; 903/907; 180/65.29; 322/28; 324/433; 324/503

(58) Field of Classification Search ................ 320/9, 21, 320/162, FOR. 108; 340/636.15, 636.2; 307/10.1; 324/433, 503; 701/22, 33.7, 34.4; 903/907; 180/65.29
See application file for complete search history.

(56) References Cited

U.S. PATENT DOCUMENTS

| | | | | |
|---|---|---|---|---|
| 4,315,205 A | * | 2/1982 | Mori et al. | 322/99 |
| 4,342,955 A | * | 8/1982 | Gant | 322/25 |
| 4,345,199 A | * | 8/1982 | Voss | 322/28 |
| 4,460,870 A | * | 7/1984 | Finger | 324/429 |
| 4,604,528 A | * | 8/1986 | Norton | 307/9.1 |
| 4,645,940 A | * | 2/1987 | Wertheim | 307/66 |
| 5,307,001 A | * | 4/1994 | Heavey | 320/125 |
| 5,406,485 A | * | 4/1995 | Wise et al. | 701/29 |
| 5,481,194 A | * | 1/1996 | Schantz et al. | 324/522 |
| 5,581,172 A | * | 12/1996 | Iwatani et al. | 322/28 |
| 5,880,589 A | * | 3/1999 | Okano | 324/548 |
| 6,194,877 B1 | * | 2/2001 | Judge et al. | 322/28 |
| 6,249,127 B1 | * | 6/2001 | Fluhrer | 324/543 |

(Continued)

FOREIGN PATENT DOCUMENTS

CN 101013875 A 8/2007

*Primary Examiner* — Mark Hellner
*Assistant Examiner* — Ari M Diacou

(57) ABSTRACT

A method for determining a voltage level across an electrical circuit of a powertrain includes measuring a plurality of voltage levels and utilizing a comparison test between at least two voltage levels of the plurality of voltage levels to determine the circuit voltage level.

19 Claims, 4 Drawing Sheets

U.S. PATENT DOCUMENTS

| | | | |
|---|---|---|---|
| 6,304,088 B1* | 10/2001 | Yee | 324/433 |
| 6,573,682 B1* | 6/2003 | Pearson | 320/101 |
| 6,832,148 B1 | 12/2004 | Bennett | |
| 6,868,318 B1 | 3/2005 | Cawthorne | |
| 7,078,881 B2* | 7/2006 | Aoyama | 322/28 |
| 7,154,236 B1 | 12/2006 | Heap | |
| 7,501,720 B2* | 3/2009 | Popescu-Stanesti et al. | 307/66 |
| 2003/0111977 A1* | 6/2003 | Pearson | 320/101 |
| 2004/0160213 A1* | 8/2004 | Stanesti et al. | 320/116 |
| 2004/0263180 A1* | 12/2004 | Rogers et al. | 324/522 |
| 2005/0017733 A1* | 1/2005 | Heinzmann et al. | 324/546 |
| 2005/0036248 A1* | 2/2005 | Klikic et al. | 361/42 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0005055 A1* | 1/2006 | Potega | 713/300 |
| 2006/0194670 A1 | 8/2006 | Heap | |
| 2007/0078580 A1 | 4/2007 | Cawthorne | |
| 2007/0093953 A1 | 4/2007 | Heap | |
| 2007/0149348 A1 | 6/2007 | Holmes | |
| 2007/0191181 A1 | 8/2007 | Burns | |
| 2007/0194795 A1* | 8/2007 | Amanuma et al. | 324/523 |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Zettel | |
| 2008/0088279 A1* | 4/2008 | Lim et al. | 320/134 |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0129307 A1* | 6/2008 | Yu et al. | 324/522 |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0040793 A1* | 2/2009 | Huynh et al. | 363/21.12 |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 | 4/2009 | Sah | |
| 2009/0111644 A1 | 4/2009 | Kaminsky | |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 | 4/2009 | Sah | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0115491 A1 | 5/2009 | Anwar | |
| 2009/0118074 A1 | 5/2009 | Zettel | |
| 2009/0118075 A1 | 5/2009 | Heap | |
| 2009/0118076 A1 | 5/2009 | Heap | |
| 2009/0118077 A1 | 5/2009 | Hsieh | |
| 2009/0118078 A1 | 5/2009 | Wilmanowicz | |
| 2009/0118079 A1 | 5/2009 | Heap | |
| 2009/0118080 A1 | 5/2009 | Heap | |
| 2009/0118081 A1 | 5/2009 | Heap | |
| 2009/0118082 A1 | 5/2009 | Heap | |
| 2009/0118083 A1 | 5/2009 | Kaminsky | |
| 2009/0118084 A1 | 5/2009 | Heap | |
| 2009/0118085 A1 | 5/2009 | Heap | |
| 2009/0118086 A1 | 5/2009 | Heap | |
| 2009/0118087 A1 | 5/2009 | Hsieh | |
| 2009/0118089 A1 | 5/2009 | Heap | |

| | | | | | | |
|---|---|---|---|---|---|---|
| 2009/0118090 A1 | 5/2009 | Heap | | 2009/0118932 A1 | 5/2009 | Heap |
| 2009/0118091 A1 | 5/2009 | Lahti | | 2009/0118933 A1 | 5/2009 | Heap |
| 2009/0118093 A1 | 5/2009 | Heap | | 2009/0118934 A1 | 5/2009 | Heap |
| 2009/0118094 A1 | 5/2009 | Hsieh | | 2009/0118935 A1 | 5/2009 | Heap |
| 2009/0118877 A1 | 5/2009 | Center | | 2009/0118936 A1 | 5/2009 | Heap |
| 2009/0118879 A1 | 5/2009 | Heap | | 2009/0118937 A1 | 5/2009 | Heap |
| 2009/0118880 A1 | 5/2009 | Heap | | 2009/0118938 A1 | 5/2009 | Heap |
| 2009/0118882 A1 | 5/2009 | Heap | | 2009/0118939 A1 | 5/2009 | Heap |
| 2009/0118883 A1 | 5/2009 | Heap | | 2009/0118940 A1 | 5/2009 | Heap |
| 2009/0118884 A1 | 5/2009 | Heap | | 2009/0118941 A1 | 5/2009 | Heap |
| 2009/0118885 A1 | 5/2009 | Heap | | 2009/0118942 A1 | 5/2009 | Hsieh |
| 2009/0118886 A1 | 5/2009 | Tamai | | 2009/0118943 A1 | 5/2009 | Heap |
| 2009/0118887 A1 | 5/2009 | Minarcin | | 2009/0118944 A1 | 5/2009 | Heap |
| 2009/0118888 A1 | 5/2009 | Minarcin | | 2009/0118945 A1 | 5/2009 | Heap |
| 2009/0118901 A1 | 5/2009 | Cawthorne | | 2009/0118946 A1 | 5/2009 | Heap |
| 2009/0118914 A1 | 5/2009 | Schwenke | | 2009/0118947 A1 | 5/2009 | Heap |
| 2009/0118915 A1 | 5/2009 | Heap | | 2009/0118948 A1 | 5/2009 | Heap |
| 2009/0118916 A1 | 5/2009 | Kothari | | 2009/0118949 A1 | 5/2009 | Heap |
| 2009/0118917 A1 | 5/2009 | Sah | | 2009/0118950 A1 | 5/2009 | Heap |
| 2009/0118918 A1 | 5/2009 | Heap | | 2009/0118951 A1 | 5/2009 | Heap |
| 2009/0118919 A1 | 5/2009 | Heap | | 2009/0118952 A1 | 5/2009 | Heap |
| 2009/0118920 A1 | 5/2009 | Heap | | 2009/0118954 A1 | 5/2009 | Wu |
| 2009/0118921 A1 | 5/2009 | Heap | | 2009/0118957 A1 | 5/2009 | Heap |
| 2009/0118922 A1 | 5/2009 | Heap | | 2009/0118962 A1 | 5/2009 | Heap |
| 2009/0118923 A1 | 5/2009 | Heap | | 2009/0118963 A1 | 5/2009 | Heap |
| 2009/0118924 A1 | 5/2009 | Heap | | 2009/0118964 A1 | 5/2009 | Snyder |
| 2009/0118925 A1 | 5/2009 | Hsieh | | 2009/0118969 A1 | 5/2009 | Heap |
| 2009/0118926 A1 | 5/2009 | Heap | | 2009/0118971 A1 | 5/2009 | Heap |
| 2009/0118927 A1 | 5/2009 | Heap | | 2009/0118999 A1 | 5/2009 | Heap |
| 2009/0118928 A1 | 5/2009 | Heap | | 2009/0139781 A1 * | 6/2009 | Straubel ................ 180/65.1 |
| 2009/0118929 A1 | 5/2009 | Heap | | 2009/0144002 A1 | 6/2009 | Zettel |
| 2009/0118930 A1 | 5/2009 | Heap | | | | |
| 2009/0118931 A1 | 5/2009 | Kaminsky | | * cited by examiner | | |

METHOD FOR DETERMINING A VOLTAGE LEVEL ACROSS AN ELECTRIC CIRCUIT OF A POWERTRAIN

CROSS REFERENCE TO RELATED APPLICATIONS

This application claims the benefit of U.S. Provisional Application No. 60/982,457 filed on Oct. 25, 2007, which is hereby incorporated herein by reference.

TECHNICAL FIELD

This application is related to systems for monitoring electric circuits of a powertrain.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method for determining a voltage level across an electrical circuit of a powertrain includes measuring a plurality of voltage levels and utilizing a comparison test between at least two voltage levels of the plurality of voltage levels to determine the circuit voltage level.

BRIEF DESCRIPTION OF THE DRAWINGS

One or more embodiments will now be described, by way of example, with reference to the accompanying drawings, in which.

DETAILED DESCRIPTION

Figure 1:
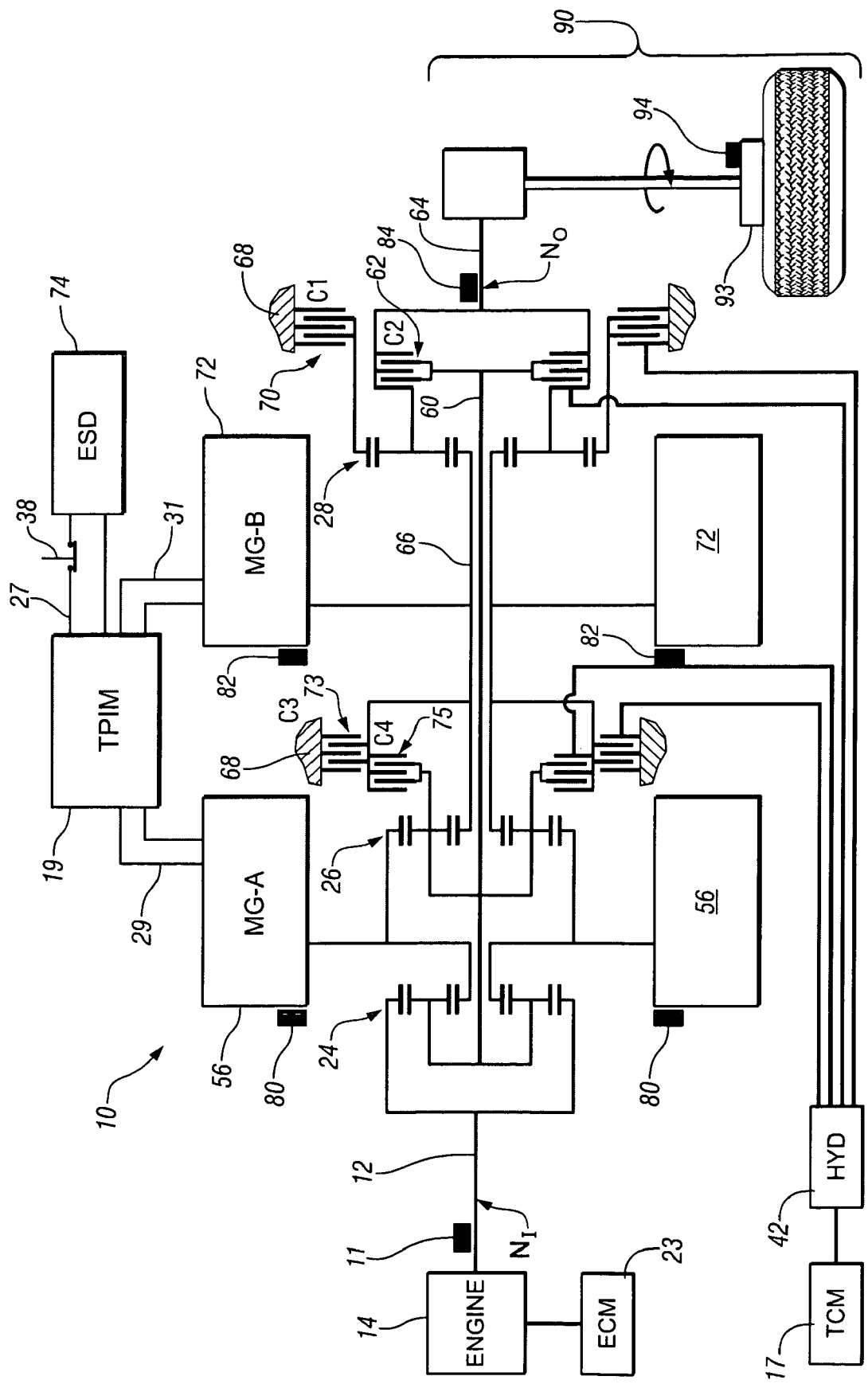
FIG. 1 is a schematic diagram of an exemplary powertrain, in accordance with the present disclosure.
Figure 2:
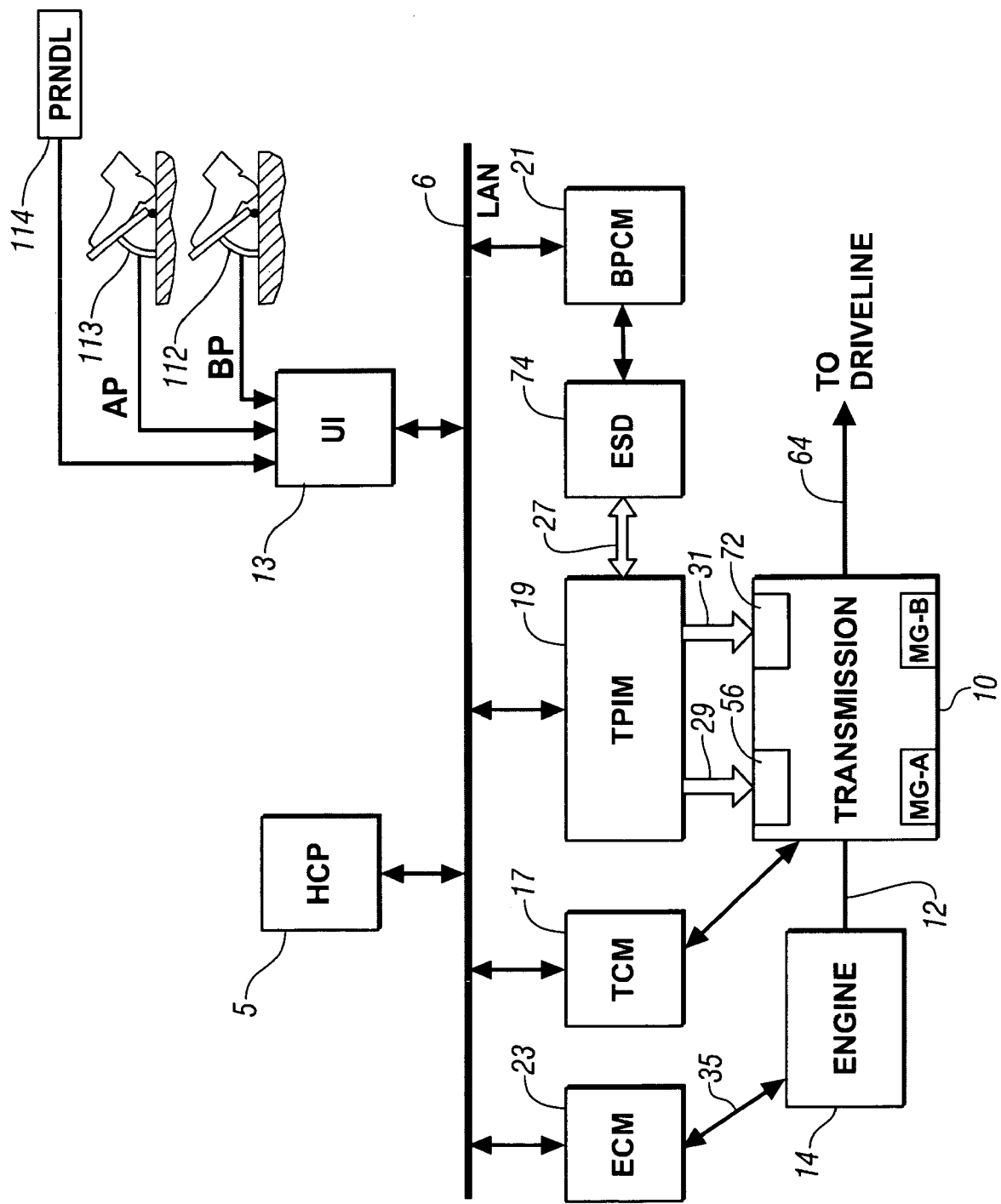
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. A. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus.

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

Figure 3:
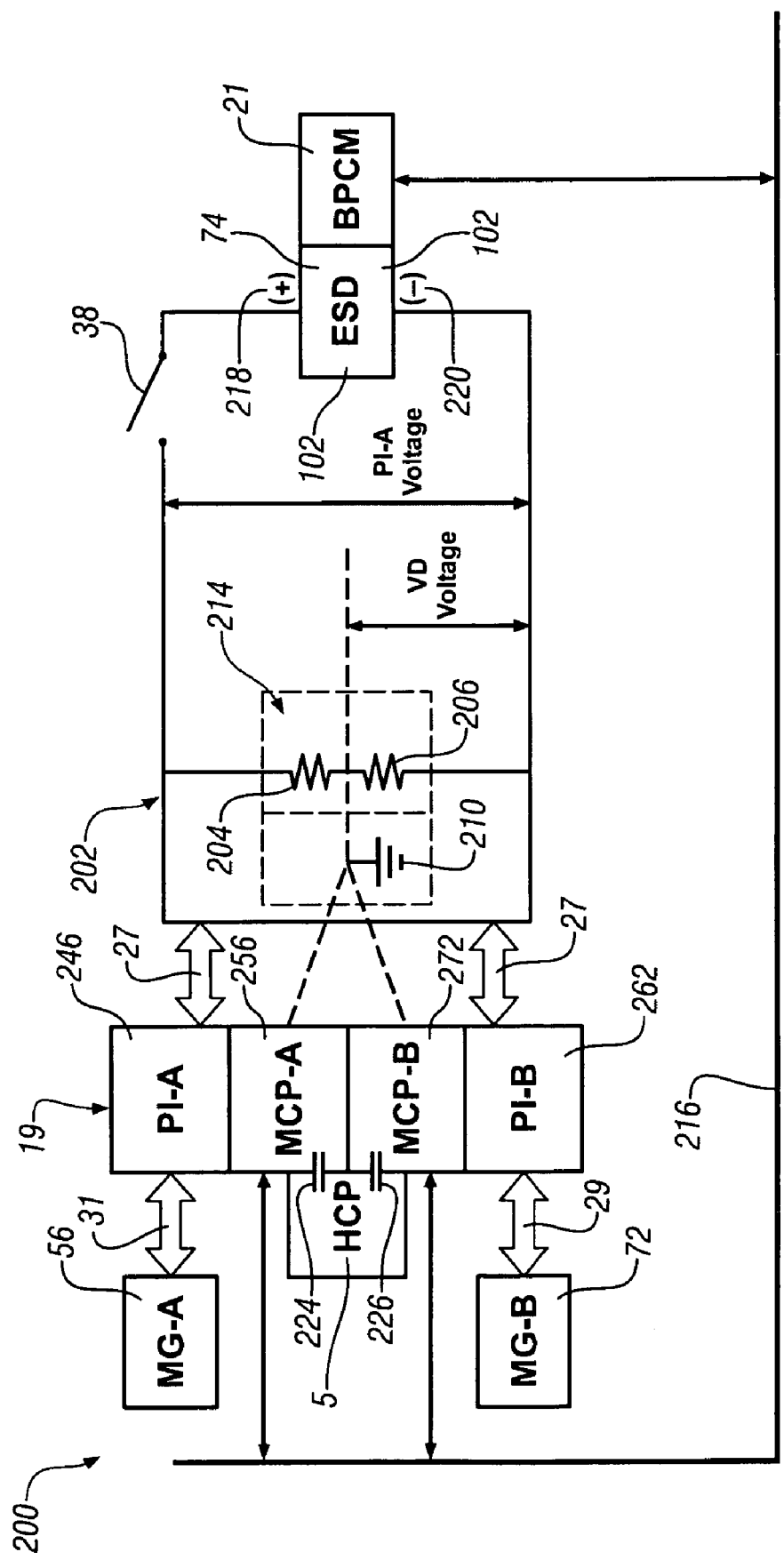
FIG. 3 is schematic diagram of a monitoring system for monitoring a high voltage circuit, in accordance with the present disclosure.

Referring to FIG. 3, a monitoring system 200 for monitoring a high voltage circuit 202 is shown. The monitoring system 200 includes components of the high voltage circuit 202 including the TPIM 19, the ESD 74, the contactor 38, a voltage divider 214, and the DC transfer conductors 27. The monitoring system 200 further includes the BPCM 21, the HCP 5, a vehicle LAN bus 216, a first HCP serial peripheral interface (hereafter 'HCP-A SPI') 224, and a second HCP serial peripheral interface (hereafter 'HCP-B SPI') 226.

The ESD 74 includes a high voltage battery 102. In one embodiment, the voltage output from the high voltage battery 102 is nominally in the range of 300 V, however, in other embodiments batteries having other voltage levels can be used. The high voltage battery 102 includes a positive terminal 218, a negative terminal 220 and several individual battery cells (not shown). The high voltage battery 102 is electrically connected to the high voltage electric circuit 202 across the positive terminal 218 and the negative terminal 220.

The BPCM 21 is signally connected to sensors (not shown) to monitor the high voltage battery 102, including states of electrical current and voltage parameters, to provide information indicative of parametric states of the high voltage battery 102 to the HCP 5. The parametric states of the high voltage battery 102 preferably include battery state-of-charge, battery voltage, battery temperature, and available battery power, referred to as a range $P_{BAT\_MIN}$ to $P_{BAT\_MAX}$.

In particular, the BPCM 21 measures a voltage level (hereafter referred to as 'ESD voltage') across the positive terminal 218 and the negative terminal 220 of the high voltage battery 102. The BPCM 21 outputs the ESD voltage to the vehicle LAN 216.

The TPIM 19 includes a first power inverter (hereafter 'PI-A') 246 and a second power inverter (hereafter 'PI-B') 262, a first motor control processor (hereafter 'MCP-A') 256 and a second motor control processor (hereafter 'MCP-B') 272. The MCP-A 256 is configured to receive torque commands and control inverter states of the PI-A 246 for providing motor drive or regeneration functionality to achieve the input torque $T_A$ to control the first electric machine 56. Likewise, the MCP-B 272 is configured to receive torque commands and control inverter states of the PI-B 262 for providing motor drive or regeneration functionality to control second electric machine 72 to achieve the input torque $T_B$.

The PI-A 246 and the PI-B 262 comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands from MCP-A 256 and MCP-B 272. There is typically one pair of insulated gate bipolar transistors for each three phases of MCP-A 256 and each of the three phases of MCP-B 272. States of the insulated gate bipolar transistors are controlled to provide motor drive mechanical power generation or electric power regeneration functionality. The PI-A 246 and the PI-B 262 receive or supply DC electric power via DC transfer conductors 27 and transform it to or from three-phase AC power, which is conducted to or from the first and second electric machines 56 and 72 for operation as motors or generators via transfer conductors 29 and 31 respectively The MCP-A 256 is signally connected to a sensing circuit (not shown) disposed within the PI-A 246. By measuring a voltage across the sensing circuit, the MCP-A 256 determines the voltage level of the high voltage circuit 202 being received by the PI-A 246 (hereafter referred to as 'PI-A voltage'). Likewise, the MCP-B 272 is signally connected to a sensing circuit (not shown) disposed within the PI-B 262. By measuring the voltage across the sensing circuit, the MCP-B 272 determines the voltage level of the high voltage circuit 202 being received by the PI-B 262 (hereafter referred to as 'PI-B voltage'). As will be described in further detail below, the PI-A voltage and PI-B voltage are subjected to comparison tests. The comparison test is a test in which a determination is made based on at least two voltage measurements. In one embodiment, the comparison test includes determining a difference between at least two measured voltages. In one embodiment, the comparison test includes comparing a measured voltage with other measured voltage levels to provide accurate voltage measurements to the HCP 5 for controlling the TPIM 19. In one embodiment, the comparison test includes comparing a measured voltage with other measured voltage levels to provide accurate voltage measurements to the HCP 5 along with other components of the powertrain.

The contactor switch 38 is an electrical switch between the ESD 74 and the TPIM 19. When the contactor switch 38 is closed, electric current can flow between the ESD 74 and the TPIM 19. When the contactor switch 38 is opened, electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 via transfer conductors 31, in response to torque commands for the first and second electric machines 56 and 72 to achieve the input torques $T_A$ and $T_B$. Electrical current is transmitted to and from the ESD 74 in accordance with whether the high voltage battery 102 is being charged or discharged.

The voltage divider 214 includes a resistor 204, a resistor 206, and a ground wire 210. The resistor 204 and the resistor 206 are each 5 MΩ resistors. The ground wire 210 is grounded to a chassis (not shown) of the vehicle. The MCP-A 256 and MCP-B 272 each are configured to measure a voltage (herein referred to as 'VD voltage') of the ground wire 210 by isolating the sensing circuits (not shown) between the negative terminal 220 and the ground wire 210. The resistor 204 and the resistor 206 on each side of the vehicle ground wire 210 allows the MCP-A 256 and MCP-B 272 to detect voltage drift or short-circuiting to the vehicle chassis from the negative terminal 220 of the high voltage battery 102. The MCP-A 256 and the MCP-B 272, each detect a voltage level between the negative terminal 220 and the ground wire 210 that is about half the voltage level across the high voltage circuit 202 when voltage drift or short-circuiting is not detected.

The vehicle LAN bus 216 is a component of the LAN bus 6 and allows the BPCM 21 to transmit voltage measurements to the MCP-A 224, the MCP-B 272, and the HCP 5. The HCP-A SPI 224 is a high speed direct communications link between the MCP-A 256 and the HCP 5. The HCP-B SPI 226 is a high speed direct communications link between the MCP-B 272 and the HCP 5. The HCP 5 is configured to receive voltage measurements directly communicated from the MCP-A 256 and the MCP-B 272 via the HCP-A SPI 224 and the HCP-B SPI 226, respectively.

Figure 4:
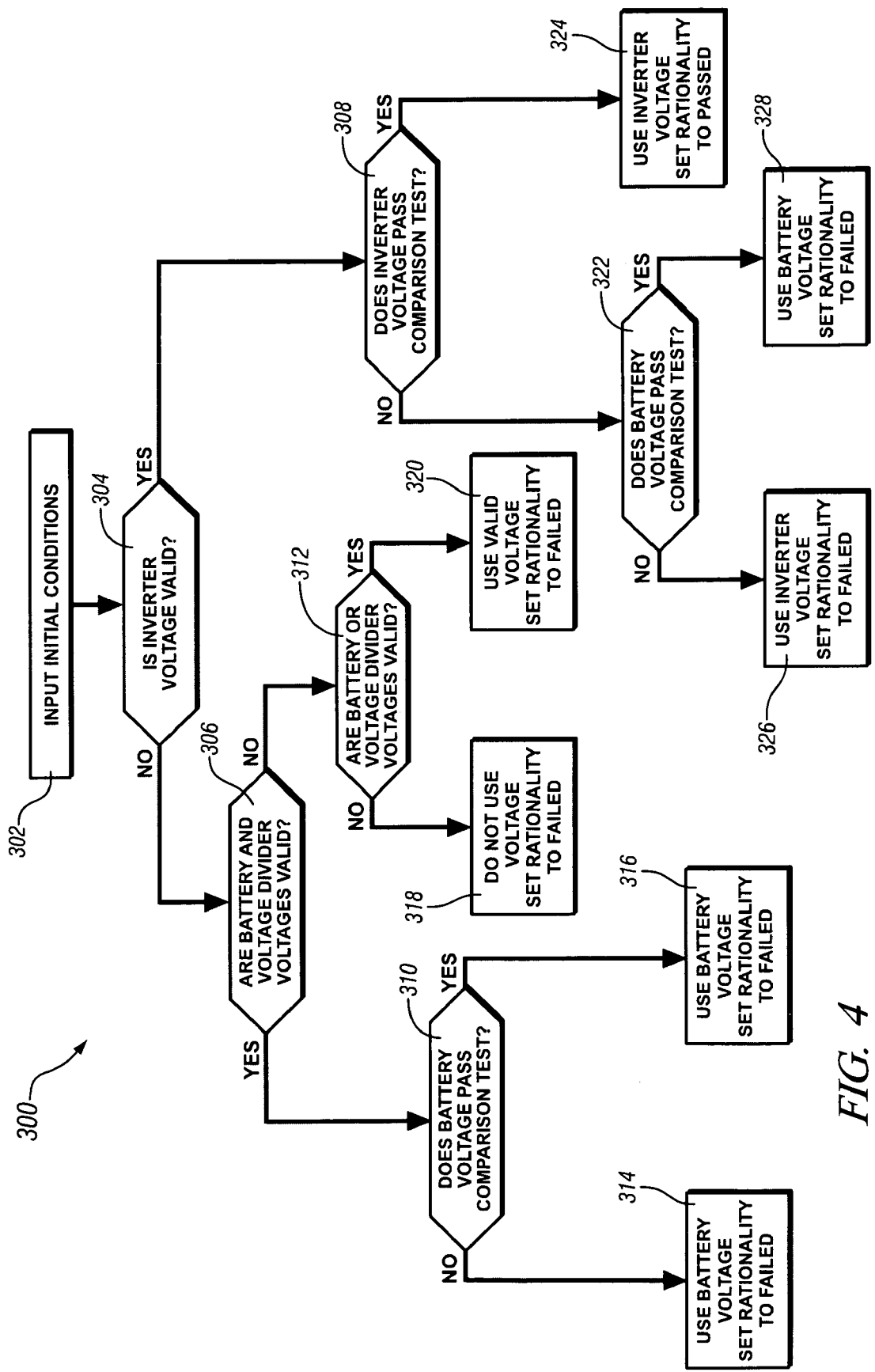
FIG. 4. is a flow chart depicting a method for determining a voltage across an electrical circuit, in accordance with the present disclosure.

Referring to FIG. 4, a method 300 for determining a voltage level across the high voltage circuit 202 is shown. In particular, the HCP 5, the MCP-A 224, and the MCP-B 272 utilize the method 300 to determine the voltage across the high voltage circuit 202 for utilization by the HCP 5 in controlling the powertrain.

As used herein, the term "valid" is meant to denote a measurement associated with a selected degree of accuracy for use in determining the voltage level of the high voltage circuit 202. Likewise, the term invalid is meant to denote a measurement that is not associated with the selected degree of accuracy for use in determining the voltage level of the high voltage circuit 202.

The MCP-A 256 inputs initial condition information (302). The initial condition information includes whether the contactor switch 38 is in an open position and whether the MCP-A 256 is receiving valid voltage measurements for the ESD voltage, the PI-A voltage and the VD voltage. The BPCM 21 determines whether the ESD voltage is within a valid ESD voltage range and sends a signal indicative an invalid voltage to the vehicle LAN 216, if the BPCM 21 determines that the ESD voltage is not within the valid ESD voltage range. The valid ESD voltage range includes predetermined voltage levels of the ESD 74 indicative of a valid voltage measurement. If the MCP-A 256 receives a valid ESD voltage measurement, the MCP-A 256 sets an ESD voltage variable to the valid ESD voltage measurement. If the MCP-A 256 receives the signal indicative of invalid ESD voltage from the vehicle LAN 216 or fails to receive an updated ESD voltage signal from the vehicle LAN 216, the MCP-A 256 sets the ESD voltage variable to indicate an invalid voltage.

The MCP-A 256 determines whether the PI-A voltage is within a valid PI-A voltage range. The valid PI-A voltage range includes predetermined voltage levels of the PI-A 246 indicative a valid voltage measurement. If the PI-A voltage is within the valid PI-A voltage range, the MCP-A 256 sets a PI-A voltage variable to the PI-A voltage. If the MCP-A 256 determines that the PI-A voltage is not within the valid PI-A voltage range, the MCP-A 256 set the PI-A voltage variable to indicate an invalid voltage.

The MCP-A 256 determines whether the VD voltage is within a valid VD voltage range. The valid VD voltage range includes predetermined voltage levels of the voltage divider 214 indicative a valid voltage measurement. If the VD voltage is within the valid voltage range, the MCP-A 256 sets the VD voltage variable to the VD voltage. If the MCP-A 256 does not measures a VD voltage within the valid voltage range, the MCP-A 256 sets a VD voltage variable to invalid.

The MCP-A 256 determines whether the PI-A voltage variable is set to a valid PI-A voltage (304). If the PI-A voltage is valid, the MCP-A 256 advances to 308, and if the PI-A voltage is invalid, the MCP-A 256 advances to 306.

The MCP-A 256 performs a PI-A voltage comparison test (308). The MCP-A 256 compares the PI-A voltage to the ESD voltage and the VD voltage.

The MCP-A 256 first performs the comparison test utilizing the ESD voltage. If an absolute value of the difference between the PI-A voltage and the ESD voltage (hereafter referred to as 'ESD voltage difference') is less than a threshold (hereafter referred to as 'ESD voltage threshold'), the MCP-A 256 sets the MCP-A voltage variable to the PI-A voltage, and the MCP-A 256 sets the MCP-A rationality variable to indicate a rationality test was passed (324).

If either the ESD voltage is invalid or the ESD voltage difference is above the ESD voltage difference threshold, the MCP-A 256 performs the comparison test utilizing the VD voltage. In particular, the MCP-A 256 multiplies the VD voltage by two (hereafter referred to as 'VD2 voltage') and compares it to the PI-A voltage.

If an absolute value of the difference between the PI-A voltage and the VD2 voltage (hereafter referred to as 'VD voltage difference') is less than a threshold (hereafter referred to as 'VD voltage threshold'), the MCP-A 256 sets a MCP-A voltage variable to the PI-A voltage, and the MCP-A 256 sets the MCP-A rationality variable to indicate a rationality test was passed (324). The MCP-A 256 further sets the MCP-A validity variable to indicate a valid voltage.

If either the VD voltage is invalid or the VD voltage difference is above the VD voltage difference threshold, and either the ESD voltage is invalid or the ESD voltage difference is above the ESD voltage difference threshold, the MCP-A 256 determines whether the ESD voltage passes a comparison test (322). In particular, the MCP-A 256 determines whether an absolute value of the difference between the ESD and the VD2 voltage (hereafter referred to as 'ESD-VD voltage difference') is less than a threshold (hereafter referred to as 'ESD-VD voltage threshold'). If the ESD-VD voltage difference is less than the ESD-VD voltage threshold, the MCP-A 256 sets the MCP-A voltage variable to the ESD voltage and sets the MCP-A rationality variable to indicate a failed rationality test (328). The MCP-A 256 further sets the MCP-A validity variable to indicate a valid voltage. If the ESD-VD voltage difference is greater than the ESD-VD voltage threshold, the MCP-A 256 sets the MCP-A voltage variable to the PI-A voltage and sets the MCP-A rationality variable to indicate a failed rationality test (326). The MCP-A 256 further sets the MCP-A validity variable to indicate a valid voltage.

If the MCP-A 256 determines the PI-A voltage invalid, the MCP-A 256 determines whether both the ESD voltage and the VD voltage are valid (306).

If the MCP-A 256 determines that both the ESD voltage and the VD voltage are valid, the MCP-A 256 determines whether the ESD voltage passes a comparison test (310). In particular, the MCP-A 256 determines whether an absolute value of the ESD-VD voltage difference is less than the ESD-VD voltage threshold. If the ESD-VD voltage difference is less than the ESD-VD voltage threshold, the MCP-A 256 sets the MCP-A voltage variable to the ESD voltage and sets the MCP-A rationality variable to indicate a failed rationality test (316). The MCP-A 256 further sets the MCP-A validity variable to indicate a valid voltage. If the ESD-VD voltage difference is less than the ESD-VD voltage threshold, the MCP-A 256 sets the MCP-A voltage variable to the ESD voltage and sets the MCP-A rationality variable to indicate a failed rationality test (314). The MCP-A 256 further sets a MCP-A validity variable to indicate a valid voltage.

The MCP-A 256 determines whether either the ESD voltage is valid or the VD voltage is valid (312). If the ESD voltage is valid, the MCP-A 256 sets the MCP-A voltage variable to the ESD voltage and sets the MCP-A rationality variable to indicate a failed rationality test, or if the VD voltage is valid, the MCP-A 256 sets the MCP-A voltage variable to the VD2 voltage and sets the MCP-A rationality variable to indicate a failed rationality test (320). The MCP-A 256 further sets a MCP-A validity variable to indicate a valid voltage. If both the ESD voltage is invalid and the VD voltage is invalid, the MCP-A 256 sets the MCP-A voltage variable to the PI-A voltage, sets the MCP-A rationality variable to indicate a failed rationality test, and sets a MCP-A validity variable to indicate an invalid voltage (318). When the MCP-A validity variable is set to indicate an invalid voltage, the MCP-A voltage variable is not used to control the powertrain.

Once the MCP-A 256 determines the MCP-A voltage variable, the MCP-A validity variable, and the MCP-A rationality variable, the MCP-A 256 sends the MCP-A voltage variable, the MCP-A validity variable, and the rationality variable via the SPI 224 to the HCP 5.

The MCP-B 272 performs a substantially similar procedure to determine a MCP-B voltage variable, a MCP-B validity variable and a MCP-B rationality variable as above described for the procedure utilized by the MCP-A 256 for setting the MCP-A voltage variable, the MCP-A validity variable, and the MCP-A rationality variable. The MCP-B 256 sends the MCP-B voltage variable, the MCP-B validity variable and the MCP-B rationality variable via the SPI 226 to the HCP 5.

The HCP 5 determines a HCP voltage variable based on the MCP-A voltage variable, the MCP-B voltage variable, both the MCP-A voltage variable and the MCP-B voltage variable or the ESD voltage variable. The HCP 5 set the HCP voltage variable to an average of the MCP-A voltage variable and the MCP-B voltage variable, if the MCP-A voltage and the MCP-B voltage variables both have a passed the rationality test, or if both are valid, but did passed the rationality test. The HCP 5 sets the HCP voltage variable to the MCP-A if the MCP-A voltage variable passed the rationality test and the MCP-B voltage variable did pass the rationality test. The HCP 5 sets the HCP voltage variable to the MCP-B voltage variable value if the MCP-A voltage variable did not pass the rationality and the MCP-B voltage variable passed the rationality test.

The HCP 5 sets the HCP voltage variable to the MCP-A voltage variable, if the MCP-A voltage variable is valid and the MCP-B voltage variable is invalid. The HCP 5 sets the HCP 5 voltage variable to the MCP-B voltage variable, if MCP-B voltage variable is valid and the MCP-A voltage variable is invalid. If both the MCP-A voltage variable and the MCP-B voltage variable are invalid, and if the ESD voltage variable received by the HCP from the BPCM via the LAN 216 is valid, the HCP 5 sets the HCP 5 voltage variable to the ESD voltage variable. If the MCP-A voltage variable, the MCP-B voltage variable and the ESD voltage variable are invalid, the HCP 5 sends signals to various control modules to command a controlled vehicle shutdown procedure to discharge the vehicle powertrain.

The HCP 5 voltage is utilized by the HCP 5 and various other control modules to control power transfer within the powertrain.

In one embodiment, the HCP voltage is used in torque calculations including calculation of torque inputs and outputs of the MG-A 56 ($T_A$) and the MG-B 72 ($T_B$). The redundant checking of high voltage from different processors provides a distributed and secure high voltage reading. By providing an accurate measurement of the voltage level of the electricity received by the PI-A246, and the PI-A262, the HCP 5 provides accurate torque calculations.

In one embodiment, the HCP 5 voltage is utilized to set high voltage battery 102 state of charge value limits for charging and discharging the high voltage battery 102.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for determining a circuit voltage level across an electrical circuit of a powertrain, the method comprising:
   measuring a plurality of voltage levels comprising first, second and third voltage levels each variously corresponding to respective ones of a voltage level measured across a battery of the electric circuit, a voltage level measured across an inverter of the electric circuit and a voltage level measured across a ground wire of a voltage divider of the electric circuit and a terminal of the battery of the electric circuit;
   utilizing a comparison test between at least two of the first, second and third voltage levels of the plurality of voltage levels to determine the circuit voltage level; and
   controlling power transfer within the powertrain based on at least the determined circuit voltage level.

2. The method of claim 1, further comprising:
   determining a difference between the first voltage level and the second voltage level of the plurality of voltage levels; and
   determining the circuit voltage level as the first voltage level when the difference between the first voltage level and the second voltage level is less than a threshold voltage level.

3. The method of claim 2, further comprising determining an invalid first voltage level if the difference between the first voltage level and the second voltage level is greater than the threshold voltage level.

4. A method for determining a circuit voltage level across an electrical circuit of a powertrain, the method comprising:
   measuring a plurality of voltage levels;
   utilizing a comparison test between at least two voltage levels of the plurality of voltage levels to determine the circuit voltage level;
   determining a difference between a first voltage level and a second voltage level of the plurality of voltage levels;
   determining a difference between the first voltage level and a third voltage level of the plurality of voltage levels;
   determining the circuit voltage level as the first voltage level if either the difference between the first voltage level and the second voltage level is less than a first threshold voltage level or the difference between the first voltage level and the third voltage level is less than a second threshold voltage level; and
   controlling power transfer within the powertrain based on at least the determined circuit voltage level.

5. The method of claim 1, wherein the first voltage level of the plurality of voltage levels is measured across one of the inverter and the battery of the electric circuit.

6. The method of claim 1, wherein the first voltage level of the plurality of voltage levels is measured across the ground wire of the voltage divider of the electric circuit and the terminal of the battery of the electric circuit.

7. The method of claim 1, wherein the first voltage level and the second voltage level of the plurality of voltage levels are measured at different locations of the electric circuit.

8. The method of claim 1, wherein the first voltage level and the second voltage level are provided to a controller along different communication busses.

9. The method of claim 1, comprising controlling charging of the battery of the powertrain based on the determined circuit voltage level.

10. The method of claim 1, comprising controlling a torque level generated by the powertrain based on the determined circuit voltage level.

11. A method for determining a circuit voltage level across an electrical circuit of a powertrain, the method comprising:
measuring a first plurality of voltage levels;
utilizing a difference between at least two voltage levels of the first plurality of voltage levels to determine a first circuit voltage level;
measuring a second plurality of voltage levels;
utilizing a difference between at least two voltage levels of a second plurality of voltage levels to determine a second circuit voltage level; and
controlling power transfer within the powertrain based on one of the determined first circuit voltage level, the determined second circuit voltage level, and both the determined first circuit voltage level and the determined second circuit voltage level.

12. The method of claim 11, wherein controlling power transfer within the powertrain comprises controlling charging of a battery of the powertrain.

13. The method of claim 11, wherein controlling power transfer within the powertrain comprises controlling a torque level generated by the powertrain.

14. The method of claim 11 further comprising:
controlling power transfer within the powertrain based on the determined first circuit voltage level when the second circuit voltage level is invalid.

15. The method of claim 11, further comprising:
controlling power transfer within the powertrain based an average of the determined first circuit voltage level and the determined second circuit voltage level.

16. The method of claim 11, further comprising:
determining a third circuit voltage level; and
controlling power transfer within the powertrain based on the third circuit voltage level, when the first circuit voltage level and the second circuit voltage level are invalid.

17. A method for determining a circuit voltage level across an electrical circuit of a powertrain, the method comprising:
determining a first circuit voltage level at a first controller and a second circuit voltage level at a second controller;
routing the determined first circuit voltage level from the first controller to a third controller;
routing the determined second circuit voltage level from the second controller to the third controller; and
controlling power transfer within the powertrain based on one of the determined first circuit voltage level, the determined second circuit voltage level, and both the determined first circuit voltage level and the determined second circuit voltage level.

18. The method of claim 17, comprising controlling charging of a battery of the powertrain based on one of the determined first circuit voltage level, the determined second circuit voltage level, and both the determined first circuit voltage level and the determined second circuit voltage level.

19. The method of claim 17, comprising controlling a torque level generated by the powertrain based on one of the determined first circuit voltage level, the determined second circuit voltage level, and both the determined first circuit voltage level and the determined second circuit voltage level.

* * * * *